United States Patent
Shin et al.

(10) Patent No.: US 10,045,253 B2
(45) Date of Patent: Aug. 7, 2018

(54) APPARATUS AND METHOD FOR INTERFERENCE CONTROL IN HETEROGENEOUS NETWORK-MULTI CELL MOBILE COMMUNICATION SYSTEM

(71) Applicants: Samsung Electronics Co., Ltd, Gyeonggi-do (KR); Korea Advanced Institute of Science and Technology, Daejeon (KR)

(72) Inventors: Dae-Kyu Shin, Daejeon (KR); Wan Choi, Daejeon (KR); Hyun-Kyu Yu, Gyeonggi-do (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 58 days.

(21) Appl. No.: 15/100,287

(22) PCT Filed: Nov. 27, 2014

(86) PCT No.: PCT/KR2014/011474
§ 371 (c)(1),
(2) Date: May 27, 2016

(87) PCT Pub. No.: WO2015/080485
PCT Pub. Date: Jun. 4, 2015

(65) Prior Publication Data
US 2017/0013505 A1    Jan. 12, 2017

(30) Foreign Application Priority Data
Nov. 27, 2013 (KR) .......................... 10-2013-0144992

(51) Int. Cl.
*H04W 28/04* (2009.01)
*H04B 7/06* (2006.01)
(Continued)

(52) U.S. Cl.
CPC .......... *H04W 28/04* (2013.01); *H04B 7/0619* (2013.01); *H04J 11/005* (2013.01); *H04L 5/0032* (2013.01)

(58) Field of Classification Search
CPC ... H04W 28/048; H04J 11/005; H04L 5/0032; H04B 7/0619
See application file for complete search history.

(56) References Cited

U.S. PATENT DOCUMENTS

2009/0227247 A1    9/2009 Byun et al.
2013/0058218 A1    3/2013 Wu et al.
(Continued)

FOREIGN PATENT DOCUMENTS

| KR | 10-2009-0095419 | 9/2009 |
| KR | 10-2010-0112754 | 10/2010 |
| WO | WO 2013/040089 A2 | 3/2013 |

OTHER PUBLICATIONS

International Search Report dated Feb. 13, 2015 in connection with International Application No. PCT/KR2014/011474; 5 pages.
(Continued)

*Primary Examiner* — Thai Nguyen

(57) ABSTRACT

The present disclosure relates to a pre-5th-generation (5G) or 5G communication system to be provided for supporting rates beyond 4th-generation (4G) communication system such as a long term evolution (LTE). An operating method of a transmitting apparatus in a mobile communication system is provided. The method comprises regenerating a first interference signal for a receiving apparatus that a service is provided by at least one transmitting apparatus different from the transmitting apparatus at second time prior to first time; and transmitting the regenerated first interference signal at the first time.

20 Claims, 12 Drawing Sheets

(51) Int. Cl.
  *H04L 5/00*   (2006.01)
  *H04J 11/00*  (2006.01)

(56) References Cited

U.S. PATENT DOCUMENTS

2013/0344908 A1* 12/2013 Hwang ................ H04W 16/14
                                                    455/501
2014/0200010 A1*  7/2014 Jose ..................... H04B 7/0413
                                                    455/450

OTHER PUBLICATIONS

Written Opinion of the International Search Authority dated Feb. 13, 2015 in connection with International Applibation No. PCT/KR2014/011474; 5 pages.

Kyoho Son et al., "REFIM: A Practical Interferene Management in Heterogeneous Wireless Access Networks", In: Selected Areas in Communications, IEEE Journal, vol. 29, Issue 6, Jun. 2011, 14 pages.

David Lopez-Perez et al., "Enhanced Intercel 1 Interference Coordination Challenges in Heterogeneous Networks", In: Wireless Communications, IEEE, vol. 18, Issue 3, Jun. 2011, 10 pages.

\* cited by examiner

APPARATUS AND METHOD FOR INTERFERENCE CONTROL IN HETEROGENEOUS NETWORK-MULTI CELL MOBILE COMMUNICATION SYSTEM

CROSS-REFERENCE TO RELATED APPLICATION(S)

The present application claims priority under 35 U.S.C. § 365 to International Patent Application No. PCT/KR2014/011474 filed Nov. 27, 2014, entitled "APPARATUS AND METHOD FOR CONTROLLING INTERFERENCE IN HETEROGENEOUS NETWORK-MULTI CELL MOBILE COMMUNICATION SYSTEM", and, through International Patent Application No. PCT/KR2014/011474, to Korean Patent Application No. 10-2013-0144992 filed Nov. 27, 2013, each of which are incorporated herein by reference into the present disclosure as if fully set forth herein.

TECHNICAL FIELD

The present disclosure relates to an apparatus and method for controlling interference in a heterogeneous network-multi cell mobile communication system.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a D2D communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

Generally, a mobile communication system has a multi cell structure, and an interference control scheme in a multi cell mobile communication system is an important factor that affects total system performance of the multi cell mobile communication system.

So, various interference control schemes have been used in a current multi cell mobile communication system, typical interference control schemes are an interference alignment scheme and a time division/frequency division transmitting scheme, and each of the interference alignment scheme and the time division/frequency division transmitting scheme will be described below.

Firstly, the interference alignment scheme will be described with reference to FIG. 1.

FIG. 1 schematically illustrates an interference alignment scheme used in a general multi cell mobile communication system.

Referring to FIG. 1, the multi cell mobile communication system includes a plurality of base stations (BSs), e.g., three base stations, i.e., a base station #1 111, a base station #2 115, and a base station #3 113, and a plurality of user equipments (UEs), e.g., three UEs, i.e., a user equipment #1 117, a user equipment #2 121, and a user equipment #3 119.

In FIG. 1, a circle illustrated in each of the base station #1 111, the base station #2 115, and the base station #3 113 indicates an antenna dimension which may be used in a transmitter, and a circle illustrated in each of the user equipment #1 117, the user equipment #2 121, and the user equipment #3 119 indicates an antenna dimension which may be used in a receiver. That is, the base station #1 111, the base station #2 115, and the base station #3 113 are the first signal transmitting apparatus, the second signal transmitting apparatus, and the third signal transmitting apparatus, respectively, and the user equipment #1 117, the user equipment #2 121, and the user equipment #3 119 are signal receiving apparatuses which correspond to the first signal transmitting apparatus, the second signal transmitting apparatus, and the third signal transmitting apparatus, i.e., the first signal receiving apparatus, the second signal receiving apparatus, and the third signal receiving apparatus, respectively.

Further, w1, w2, and w3 indicate transmission signals which are transmitted by each of the signal transmitting apparatuses. In each of the signal receiving apparatuses, circles that are not hatched indicate an antenna dimension in which a main signal may be acquired, and hatched circles indicate an antenna dimension for processing aligned interference signals. Here, the interference alignment scheme denotes a scheme that a signal transmitting apparatus transmits a signal using a part of total antenna dimensions that the signal transmitting apparatus has thereby a signal is received in an interference alignment dimension in other signal receiving apparatus which is not a signal receiving apparatus which corresponds to the signal transmitting apparatus, i.e., a signal receiving apparatus that the signal transmitting apparatus interferes, and a signal is received in other antenna dimensions, not the interference alignment dimension in the signal receiving apparatus which corresponds to the signal transmitting apparatus.

That is, a signal transmitted by the base station #1 111 is received in a hatched circle, i.e., in an interference alignment dimension in the user equipment #2 121 and the user equipment #3 119, and is received in a circle which is not hatched, i.e., an antenna dimension which is not an interference alignment dimension in the user equipment #1 117. A signal transmitted by the base station #2 115 is received in an interference alignment dimension in the user equipment #1 117 and the user equipment #3 119, and is received in an antenna dimension which is not an interference alignment dimension in the user equipment #2 121. A signal transmitted by the base station #3 113 is received in an interference alignment dimension in the user equipment #1 117 and the user equipment #2 121, and is received in an antenna dimension which is not an interference alignment dimension in the user equipment #3 119.

Since there is no main signal which targets each of the signal receiving apparatuses, i.e., each of the user equipment #1 117, the user equipment #2 121, and the user equipment #3 119 in an interference alignment dimension, each of the user equipment #1 117, the user equipment #2 121, and the user equipment #3 119 may not decode signals received through the interference alignment dimension and decodes signals received through antenna dimensions except for the interference alignment dimension. Hereby, a corresponding signal receiving apparatus does not decode a signal received in an interference alignment dimension, so a signal received in remaining antenna dimensions except for an interference alignment dimension is not affected by interference.

An interference alignment scheme used in a general multi cell mobile communication system has been described with reference to FIG. 1, and a time division/frequency division transmitting scheme used in a general multi cell mobile communication system will be described with reference to FIG. 2.

FIG. 2 schematically illustrates a time division/frequency division transmitting scheme used in a general multi cell mobile communication system.

Prior to a description of FIG. 2, the time division/frequency division transmitting scheme is the most basic transmitting scheme that may remove influence of inter-cell interference in a multi cell environment, and total time/frequency resources which are usable in the multi cell mobile communication system are equally divided for K cells included in the multi cell mobile communication system, so the K cells independently use the divided time/frequency resources.

Signal transmission/reception in a case that K is 3 (K=3), i.e., a case that a time division/frequency division scheme is applied for three cells is illustrated in FIG. 2. In FIG. 2, each one indicates a base station and a user equipment which corresponds to the base station, and three types of hatched quadrangles with different forms indicate a time/frequency resource. If there are three cells in the multi cell mobile communication system, total time/frequency resource is equally divided into three parts, and each of the three cells uses one of the three parts thereby the three parts do not overlap one other.

A data rate which may be acquired by each of the three cells is ⅓ of a data rate in a case that each cell uses the total time/frequency resource of the multi cell mobile communication system, so there is loss in an aspect of data rate.

As described above, the interference alignment scheme has a problem that there is great loss for a remaining antenna dimension which is not used for signal transmission even though the interference alignment scheme may fully acquire a signal transmitted through an antenna dimension used for signal transmission without impact of other interference. The interference alignment scheme transmits a signal in a direction that interferences in other user equipments is aligned, not a direction that increases strength of a main signal on signal transmission, and an object of the interference alignment scheme is for acquiring a maximum degree of freedom, not a high data rate, so a data rate which is achieved when transmission power is low is not great.

In a case that transmission power is low, it may be difficult to guarantee that the interference alignment scheme which requires channel information related to all signal transmitting/receiving apparatuses has greater performance compared to other existing interference control schemes which do not require to acquire channel information. For performing the interference alignment scheme, all base stations need to be capable of using information on all interference channels included in an interference channel in real time. However, in a multi cell mobile communication system that channel characteristic changes in real time, it is difficult to correctly use channel information for all base stations in real time, and it is more difficult to carry correct channel information if there is capability limitations for a feedback link.

Further, the time division/frequency division transmitting scheme has an advantage that the time division/frequency division transmitting scheme does not require real-time interference channel information and may relatively easily transmit a signal without impact of interference. However, the time division/frequency division transmitting scheme has a disadvantage that acquirable data rate rapidly decreases in proportion to the number of base stations since a plurality of base stations divide and use the limited time/frequency resource. That is, due to impact of interference, a case that a few time/frequency resource is used may result in more serious loss to a data rate compared to a case that channel quality, e.g., a Signal-to-Interference plus Noise Ratio (SINR) decreases, so the time division/frequency division transmitting scheme generally has very low performance in a multi cell interference channel environment.

Further, there is a disadvantage that a user equipment does not use all of total transmission time when the multi cell mobile communication system uses the time division transmitting scheme, and there is a disadvantage that relatively narrow frequency band is used when the multi cell mobile communication system uses the frequency division transmitting scheme, so the user equipment is more seriously affected by channel state.

Recently, a mobile communication environment has become complex day by day, and has considered various base station environments as well as a hierarchical communication structure such as a femto-cell, and the like. So, a role of a base station becomes more important than ever for preventing performance degradation of a user equipment.

So, there is a need for an interference control scheme for considering various interference channel models for solving an inter-multi cell interference problem and decreasing amount of inter-cell interference.

The above information is presented as background information only to assist with an understanding of the present disclosure. No determination has been made, and no assertion is made, as to whether any of the above might be applicable as prior art with regard to the present disclosure.

SUMMARY

An embodiment of the present disclosure proposes an apparatus and method for controlling interference in a heterogeneous network-multi cell mobile communication system.

An embodiment of the present disclosure proposes an apparatus and method for controlling interference by considering time delay for interference channel feedback in a heterogeneous network-multi cell mobile communication system.

An embodiment of the present disclosure proposes an apparatus and method for controlling interference by considering time delay for interference channel feedback while assuming that all of signal transmitting apparatuses know channel information among all of the signal transmitting apparatuses and all of signal receiving apparatuses one another in a heterogeneous network-multi cell mobile communication system. In accordance with an aspect of the present disclosure, an operating method of a transmitting apparatus in a mobile communication system is provided.

The operating method includes regenerating a first interference signal for a receiving apparatus that a service is provided by at least one transmitting apparatus different from the transmitting apparatus at second time prior to first time; and transmitting the regenerated first interference signal at the first time.

In accordance with another aspect of the present disclosure, an operating method of a receiving apparatus in a mobile communication system is provided. The operating method includes receiving a first interference signal from a transmitting apparatus, wherein the first interference signal is an interference signal which the transmitting apparatus regenerates for a receiving apparatus that a service is provided by at least one transmitting apparatus different from the transmitting apparatus at second time prior to first time.

In accordance with another aspect of the present disclosure, a receiving apparatus in a mobile communication system is provided. The receiving apparatus includes a receiver configured to receive a first interference signal from a transmitting apparatus, wherein the first interference signal is an interference signal which the transmitting apparatus regenerates for a receiving apparatus that a service is provided by at least one transmitting apparatus different from the transmitting apparatus at second time prior to first time.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
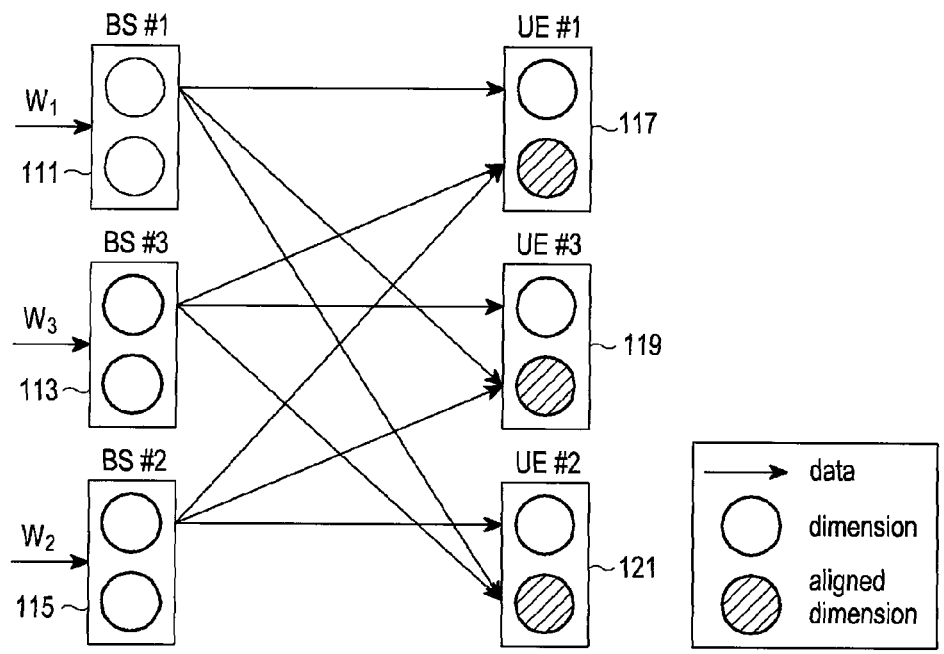
FIG. 1 schematically illustrates an interference alignment scheme used in a general multi cell mobile communication system.
Figure 2:
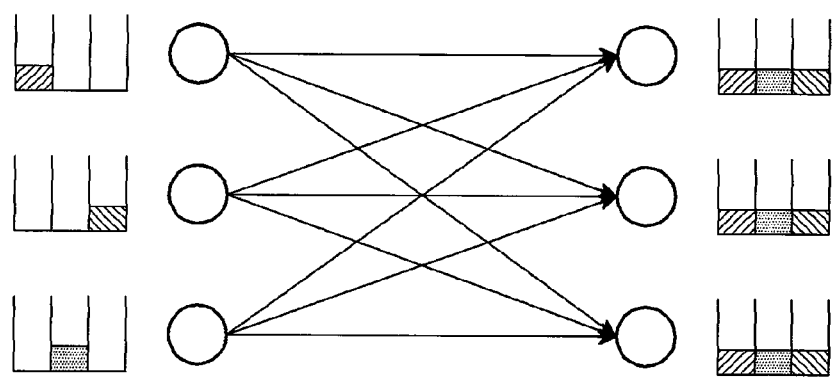
FIG. 2 schematically illustrates a time division/frequency division transmitting scheme used in a general multi cell mobile communication system.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used to enable a clear and consistent understanding of the present disclosure. Accordingly, it should be apparent to those skilled in the art that the following description of various embodiments of the present disclosure is provided for illustration purpose and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used for distinguishing one component from another component. For example, a first component may be referred to as a second component and likewise, a second component may also be referred to as a first component, without departing from the teaching of the concept. The term "and/or" used herein includes any and all combinations of one or more of the associated listed items.

The terminology used herein is for the purpose of describing various embodiments and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

An embodiment of the present disclosure proposes an apparatus and method for controlling interference in a heterogeneous network-multi cell mobile communication system.

Another embodiment of the present disclosure proposes an apparatus and method for controlling interference by considering time delay of interference channel feedback in a heterogeneous network-multi cell mobile communication system.

Still another embodiment of the present disclosure proposes an apparatus and method for controlling interference by considering time delay of interference channel feedback while assuming that all of signal transmitting apparatuses know channel information among all of the signal transmitting apparatuses and all of signal receiving apparatuses one another in a heterogeneous network-multi cell mobile communication system.

According to various embodiments of the present disclosure, for example, a signal receiving apparatus may be an electronic device.

Hereinafter, for convenience, in embodiments of the present disclosure, it will be assumed that a signal transmitting apparatus is a base station (BS) and a signal receiving apparatus is a user equipment (UE).

An apparatus and method for controlling interference proposed in the present disclosure may be applied to various heterogeneous network-multi cell mobile communication systems such as a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system of a $3^{rd}$ generation partnership project 2 (3GPP2), a wideband code division multiple access (WCDMA) mobile communication system of the 3GPP2, a code division multiple access (CDMA) mobile communication system of the 3GPP2, an institute of electrical and electronics engineers (IEEE) 802.16m communication system, and/or the like.

Firstly, interference control schemes which are implemented and considered in a current mobile communication system are mainly based on an assumption that all of base stations know channel information among all of the base stations and user equipments which compose an interference channel environment one another, and an interference control scheme which uses time delay of interference channel feedback has not been studied yet. An interference control scheme which uses channel information fed back after random time delay may be realized for supplementing a problem of existing interference control schemes such as feedback overhead which requires all real time interference channel information and ineffective usage for a time/frequency resource, there may be a need and importance for a scheme for controlling interference by considering time delay of interference channel feedback are very high. Specially, in a situation that various structured-hierarchical communication structures have been studied as a standard model of a next generation mobile communication environment, there may be a need for an interference control scheme for effectively removing impact of interference and maximizing a performance of a user equipment is very high.

Further, in an interference channel environment, a scheme for controlling interference requests channel information for all nodes which compose an interference channel from all base stations for decreasing impact of interference. This criterion makes it difficult for a base station to use all channel information in real time when the number of nodes becomes great and channel information becomes changed in real time, so it is difficult to practically implement an existing interference control scheme. A difficult point in using channel information in real time is that interference channel information is not used unlike a time division/frequency division scheme, and ineffective usage of a time/frequency resource occurs, so total performance of a mobile communication system is seriously degraded.

For decreasing this degradation of total performance of a mobile communication system, there may be a need for an interference control scheme which uses channel information fed back after time delay becomes high. Considering a development direction of a recent and future mobile communication environment, an environment that there are base stations which have various structures and various functions may be considered, there may be a need for an interference control scheme which may effectively control interference in this complex communication environment becomes high.

So, an embodiment of the present disclosure proposes an interference control scheme for using interference channel information fed back to a base station after random time delay which may be used in a heterogeneous network-multi cell mobile communication system with a complex structure. So, an interference control scheme proposed in an embodiment of the present disclosure may solve difficulties in acquiring channel information, loss of a resource, and performance degradation which occur in an existing interference control schemes.

Firstly, a structure of a heterogeneous network-multi cell mobile communication system according to an embodiment of the present disclosure will be described with reference to FIG. 3.

Figure 3:
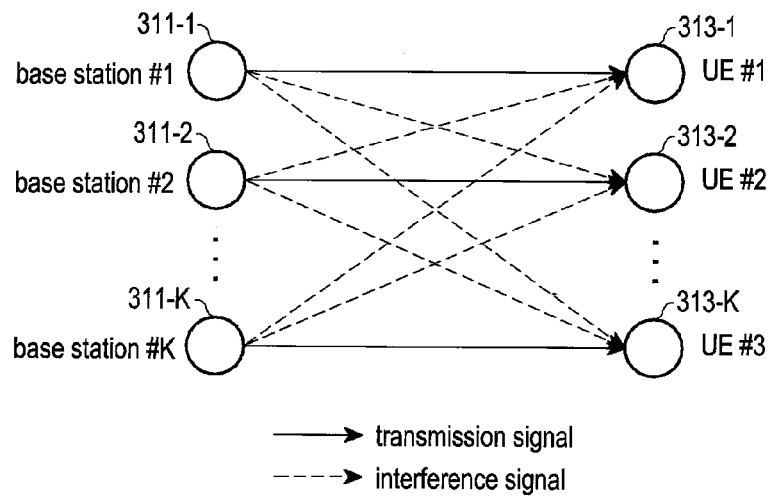
FIG. 3 schematically illustrates a structure of a heterogeneous network-multi cell mobile communication system according to an embodiment of the present disclosure.

FIG. 3 schematically illustrates a structure of a heterogeneous network-multi cell mobile communication system according to an embodiment of the present disclosure.

Referring to FIG. 3, the network-multi cell mobile communication system includes a plurality of base stations, e.g., K base stations, i.e., a base station #1 311-1, a base station #2 311-2, . . . , a base station #K 311-K, and a plurality of user equipments, e.g., K user equipments, i.e., a user equipment #1 313-1, a user equipment #2 313-2, . . . , a user equipment #K(313-K).

A network-multi cell mobile communication system in FIG. 3 indicates a communication environment in which K base stations and K user equipments interfere one another. For example, a network-multi cell mobile communication system in FIG. 3 may be classified into a scenario 1 communication environment model and a scenario 2 communication environment model to be described in FIG. 4.

Here, the scenario 1 communication environment model is a downlink communication environment model assuming an environment that there are K equivalent cells, and the scenario 2 communication environment model is a downlink communication environment model assuming that K−1 base stations are femto-cells which are independently operated according to relation between the number of transmission antennas/reception antennas "M" included in a base station and the number of transmission antennas/reception antennas "N" included in user equipments, and one base station is a macro-cell which may know a part or all of transmission symbols of femto-cells. Each base station performs a communication with K corresponding user equipments in all of the scenario 1 communication environment model and the scenario 2 communication environment model.

An embodiment of the present disclosure proposes a scheme for configuring a transmission signal through a partial cooperative communication and/or a complete cooperative communication among a macro-cell and femto-cells, a scheme for configuring and transmitting a transmission signal in a base station which uses channel information fed back after random time delay, and a scheme for processing a reception signal and controlling interference in a user equipment.

A process for selecting a communication environment model in a heterogeneous network-multi cell mobile communication system according to an embodiment of the present disclosure will be described with reference to FIG. 4.

Figure 4:
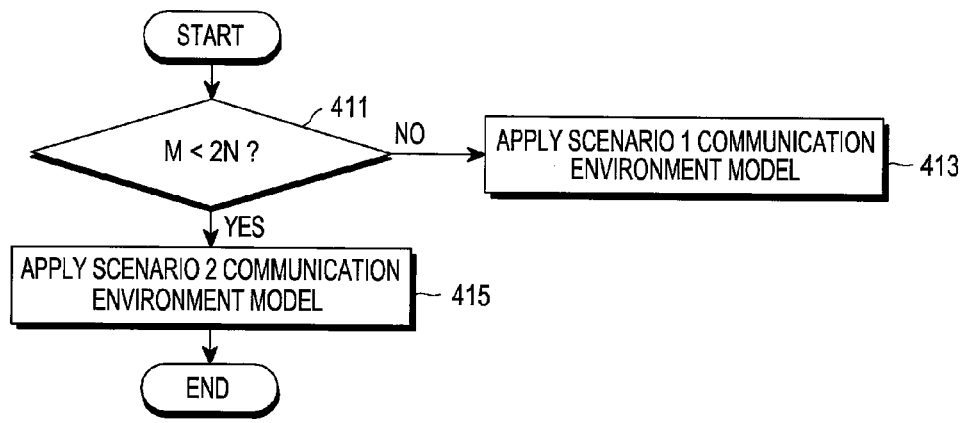
FIG. 4 schematically illustrates a process for selecting a communication environment model in a control apparatus in a heterogeneous network-multi cell mobile communication system according to an embodiment of the present disclosure.

FIG. 4 schematically illustrates a process for selecting a communication environment model in a control apparatus in a heterogeneous network-multi cell mobile communication system according to an embodiment of the present disclosure.

Prior to a description of FIG. 4, the control apparatus is an apparatus which controls total deployment and operation of the heterogeneous network-multi cell mobile communication system, implementation form thereof may be various, and a detailed description thereof will be omitted herein.

Referring to FIG. 4, the control apparatus determines whether M is less than 2N (M<2N) at step 411. If M is not less than 2N, i.e., M is equal to or greater than 2N (M≥2N), the control apparatus proceeds to step 413. The control apparatus determines to apply a scenario 1 communication environment model to the heterogeneous network-multi cell mobile communication system at step 413. Here, determining to apply a scenario 1 communication environment model to a heterogeneous network-multi cell mobile communication system indicates that the number of reception antennas included in the user equipment is sufficiently greater than the number of transmission antennas included in the user equipment, thereby cooperation among base stations is not required when transmission is started. That is, determining to apply a scenario 1 communication environment model to a heterogeneous network-multi cell mobile communication system indicates that all base stations have the equivalent qualification.

If M is less than 2N at step 411, the control apparatus proceeds to step 415. The control apparatus determines to apply a scenario 2 communication environment model to the heterogeneous network-multi cell mobile communication system at step 415.

Although FIG. 4 illustrates a process for selecting a communication environment model in a heterogeneous network-multi cell mobile communication system according to an embodiment of the present disclosure, various changes could be made to FIG. 4. For example, although shown as a series of operations, various operations in FIG. 4 could overlap, occur in parallel, occur in a different order, or occur multiple times.

A process for selecting a communication environment model in a heterogeneous network-multi cell mobile communication system according to an embodiment of the present disclosure has been described with reference to FIG. 4, and each of the scenario 1 communication environment model and the scenario 2 communication environment model will be described below.

Firstly, the scenario 1 communication environment model will be described below.

The scenario 1 communication environment model is applied in a case that the number of transmission antennas included in base stations is sufficiently greater than the number of reception antennas included in a user equipment, thereby cooperation among the base stations is not required when transmission is started. Here, difference between the number of the transmission antennas included in the base stations and the number of the reception antennas included in the user equipment may be additionally defined in the scenario 1 communication environment model, and a detailed description thereof will be omitted herein. Meanwhile, in the scenario 1 communication environment model, all base stations have the equivalent qualification.

Meanwhile, it will be defined that channel information feedback delay time during which feedback of channel information is delayed is one time slot, and it will be assumed that a channel does not change during at least one time slot and channel information feedback delay time is one time slot in a heterogeneous network-multi cell mobile communication system according to an embodiment of the present disclosure.

So, a process for controlling interference according to an embodiment of the present disclosure used in the scenario 1 communication environment model includes three phases, and this will be described with reference to FIG. 5.

Figure 5:
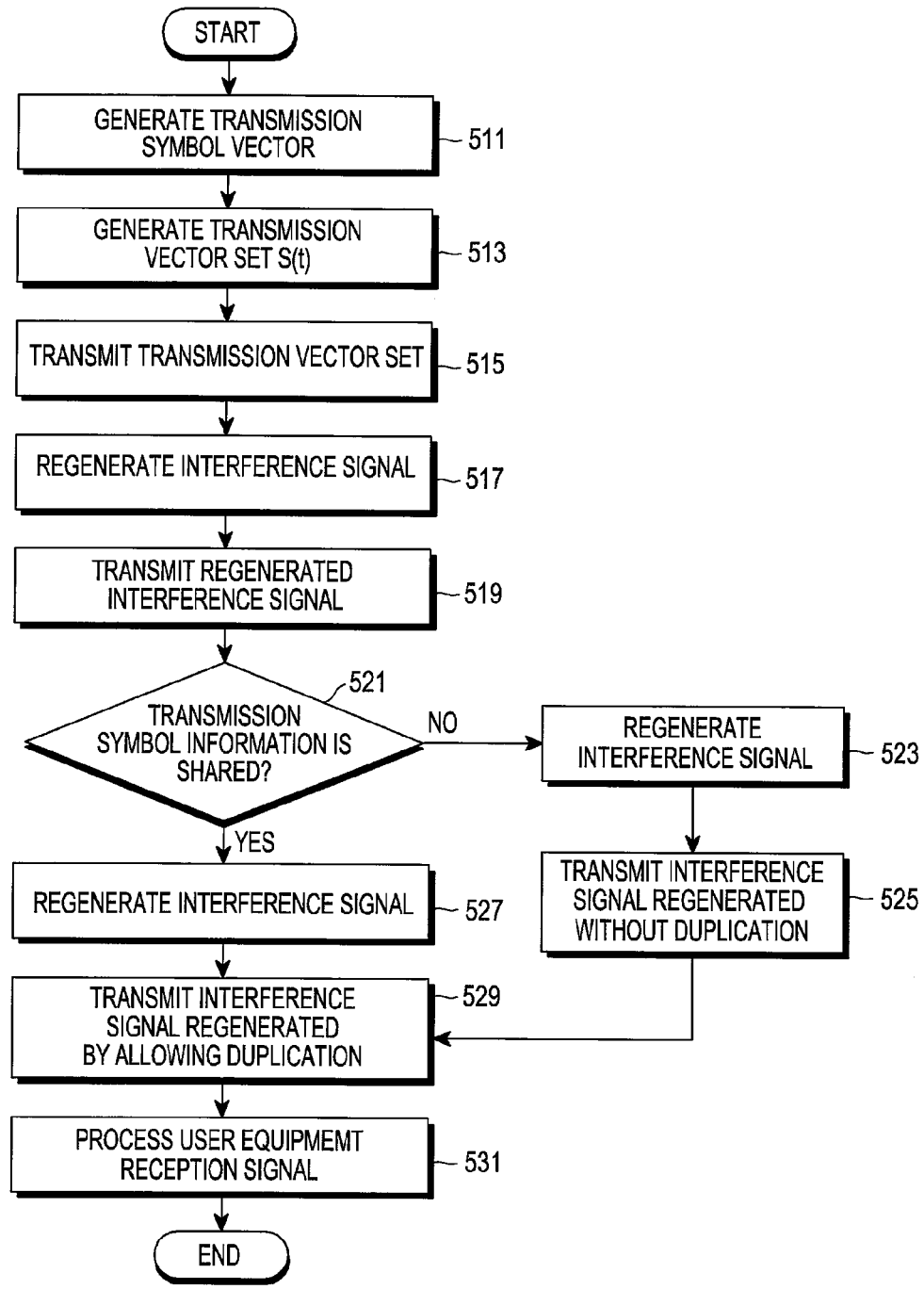
FIG. 5 schematically illustrates a process for controlling interference in a base station in a case that a scenario 1 communication environment model is applied to a heterogeneous network-multi cell mobile communication system according to an embodiment of the present disclosure.

FIG. 5 schematically illustrates a process for controlling interference in a base station in a case that a scenario 1 communication environment model is applied to a heterogeneous network-multi cell mobile communication system according to an embodiment of the present disclosure.

Referring to FIG. 5, a process for controlling interference used in a case that a scenario 1 communication environment model is applied to a heterogeneous network-multi cell mobile communication system according to an embodiment of the present disclosure includes a phase 1 to a phase 3, and each of the phase 1 to the phase 3 will be described below.

(1) Phase 1

The phase 1 is a start phase of signal transmission, base stations have no interference channel information, so each of the base stations transmits a signal to a corresponding user equipment without using channel information. Here, the phase 1 is performed during K times slots.

Figure 6:
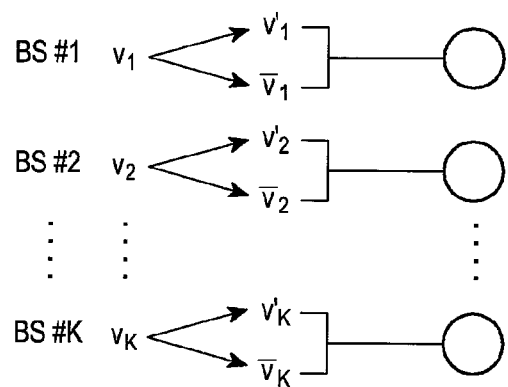
FIG. 6 schematically illustrates a process for generating a transmission symbol vector in a base station in a case that a scenario 1 communication environment model is applied to a heterogeneous network-multi cell mobile communication system according to an embodiment of the present disclosure.

Firstly, a symbol vector $v_i$ including 4N symbols includes two random 2N×1 vectors as illustrated as FIG. 6 (step 511), this is expressed as Equation 1. A process for configuring a transmission symbol vector in a case that total K base stations intend to transmit 4N transmission symbols is schematically illustrated in FIG. 6, and a transmission symbol vector which a base station #i intends to transmit is $v_i=[v_{i1}, v_{i2}, \ldots V_{i4N}]^T$, and includes a 4N×1 vector.

$$v_i'=[v_1', \ldots, v_{2N}']^T = \Phi_{i,1} v_i$$

$$\bar{v}_i=[\bar{v}_1, \ldots, \bar{v}_{2N}]^T = \Phi_{i,2} v_i \qquad \text{<Equation 1>}$$

In Equation 1, $v_i'$ and $\bar{v}_i$ denote a vector of which an one element is a combination which is randomly composed of composition symbols included in $v_i$. In Equation 1, $\Phi_{i,1}$ and $\Phi_{i,2}$ are 2N×4N matrices and include random elements. Here, each of $v_i'$ and $\bar{v}_i$ will be referred to as 'new transmission vector'. Further, $\Phi_{i,1}$ and $\Phi_{i,2}$ are shared by a base station #i and a user equipment #i. As a result, there are 2K new transmission vectors $v_i'$ and $\bar{v}_i$ for total K base stations.

Figure 7:
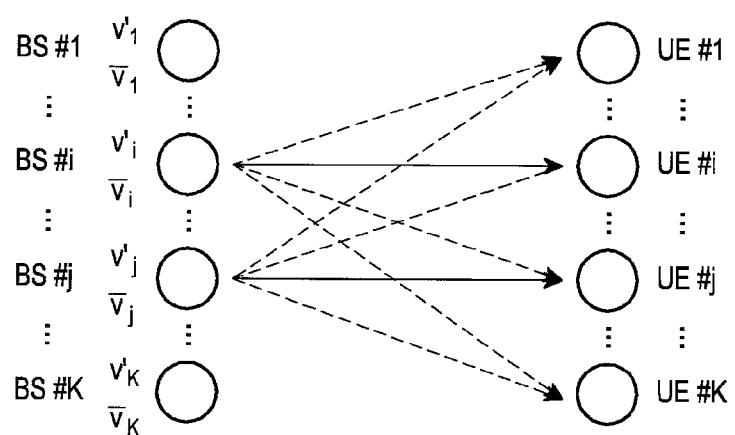
FIG. 7 schematically illustrates a process for generating a transmission symbol vector set in a base station in a case that a scenario 1 communication environment model is applied to a heterogeneous network-multi cell mobile communication system according to an embodiment of the present disclosure.

In the phase 1, as illustrated as FIG. 7, total K transmission vector sets are generated by generating 2K new transmission vectors in pairs two by two (step 513). Here, a transmission vector set will be referred to as 'S(t)'.

Each of the transmission vector sets may be generated as any combination for new transmission vectors among different base stations. The transmission vector set may be generated with various forms except for a case that the transmission vector set includes new transmission vectors of the same base station, so there may be K(K−1) methods for generating a transmission vector set.

In a case that K is an odd number, an embodiment of the present disclosure will assume transmission vector sets $\{v_1', v_2'\}, \{v_3', v_4'\}, \ldots, \{v_{K-2}', v_{K-1}'\}, \{v_K', \bar{v}_1\}, \{\bar{v}_2, \bar{v}_3\}, \ldots, \{\bar{v}_{K-1}, \bar{v}_K\}$. Similarly, in a case that K is an even number, an embodiment of the present disclosure will assume transmission vector sets $\{v_1', v_2'\}, \ldots, \{v_{K-1}', v_K'\}, \{v_1', \bar{v}_2\}, \ldots, \{\bar{v}_{K-1}, \bar{v}_K\}$. Each of the transmission vector sets is sequentially transmitted through different time slots.

So, in a time slot #1, $v_1', v_2'$ are transmitted in a base station #1 and a base station #2 at the same time. In a time slot #2, $v_3', v_4'$ are transmitted in a base station #3 and a base station #4 at the same time. In this way, K transmission vector sets are sequentially transmitted during total K time slots (step 515). In a case that it will be assumed that S(t) is a transmission vector set which is transmitted at time t (t=1, . . . , K), the K transmission vector sets may be expressed as S(1), . . . , S(K). That is, S(1)={s$_1$(1), s$_2$(1)}= {(v$_1$',v$_2$') and s$_1$(1)=v$_1$', s$_2$(1)=v$_2$'.

Although not shown in FIG. 5, user equipments store a signal which is received in each of time slots in a memory.

In a case that it will be assumed that a base station #j and a base station #k transmit a symbol vector set S(t) at a time slot #t, a signal which is received by a user equipment #i may be expressed as Equation 2.

$$y_i(t)=H_{ij}(t)s_1(t)+H_{ik}(t)s_2(t) \quad \text{<Equation 2>}$$

In Equation 2, H$_{ij}$(t) denotes an N×M channel matrix from the base station #j to the user equipment #i at the time slot #t.

The user equipment #i includes N reception antennas, so y$_i$(t) includes an N×1 vector.

(2) Phase 2

In a phase 2, a transmission signal is generated using interference channel information in a phase 1 which is given after time delay. The phase 2 is performed during total K time slots corresponding to K time slots in phase 1. According to set relation of transmission vectors which are divided in the phase 1, base stations use a time slot corresponding to each transmission vector set order.

In phase 2, the base station regenerates an interference signal which is affected by a signal of other base stations included in the same symbol set (step 517), and transmits the regenerated interference signal (step 519). For example, if new transmission vectors v$_j$',v̄$_k$ of a base station #k and a base station #j are included in the same set and transmitted at a time slot # in the phase 1, the base station #k and the base station #j regenerate and transmit H$_{kj}$(t)v$_j$' and H$_{jk}$(t)v̄$_k$ at time slot #K+t in the phase 2.

A transmitting process in the phase 2 will be described with reference to FIG. 8.

Figure 8:
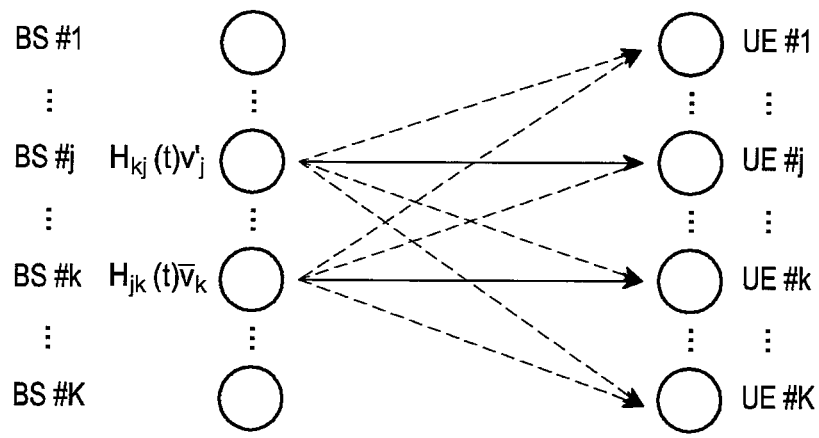
FIG. 8 schematically illustrates a transmitting process performed in a phase 2 included in an interference control process performed in a base station in a case that a scenario 1 communication environment model is applied to a heterogeneous network-multi cell mobile communication system according to an embodiment of the present disclosure.

FIG. 8 schematically illustrates a transmitting process performed in a phase 2 included in an interference control process performed in a base station in a case that a scenario 1 communication environment model is applied to a heterogeneous network-multi cell mobile communication system according to an embodiment of the present disclosure.

Referring to FIG. 8, a reception signal of a user equipment #i at a time slot #K+t may be expressed as Equation 3.

$$y_i(K+t)=H_{ij}(K+t)H_{kj}(t)s_1(t)+H_{ik}(K+t)H_{jk}(t)s_2(t) \quad \text{<Equation 3>}$$

The reception signal y$_i$(K+t) as expressed in Equation 3 also includes an N×1 vector like y$_i$(t) expressed in Equation 2.

Although not shown in FIG. 5, user equipments store a signal received in each of time slots in a memory.

(3) Phase 3

In a phase 3, a transmission signal is generated using channel information in a phase 2 which is given after time delay. The phase 3 may be performed with one of two operating schemes according to a case that base stations exchange transmission symbol information and a case that base stations do not exchange transmission symbol information (step 521). That is, the base station determines whether transmission symbol information is shared (step 521).

An operating process of a phase 3 performed according to whether the base station shares transmission symbol information with other base stations will be described below.

Firstly, a case that the base station shares the transmission symbol information with the other base stations, i.e., a case that the base station performs a cooperative communication with the other base stations will be described below.

Figure 9:
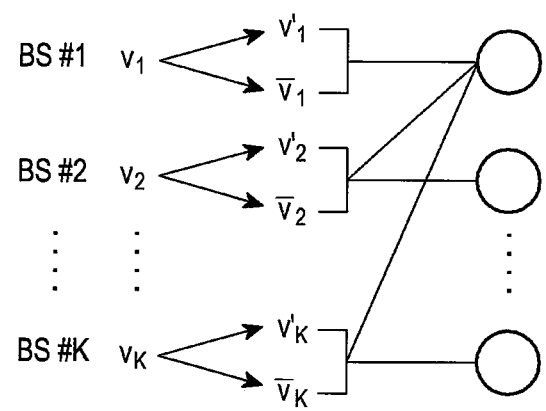
FIG. 9 schematically illustrates a process for generating a transmission symbol vector in a phase 3 in a base station in a case that a scenario 1 communication environment model is applied to a heterogeneous network-multi cell mobile communication system according to an embodiment of the present disclosure.

Firstly, it will be assumed that base stations included in the same symbol vector set exchange one of new transmission vectors one another during a phase 1 and a phase 2 before the phase 3 as described in FIG. 9. Here, a case that base stations do not exchange v$_i$ as an original transmission symbol vector, and base stations exchange v$_i$' and v̄$_i$ will be considered.

Comparing to a case that all base stations share symbols, only base stations included in the same transmission vector set share symbols, so much information is not exchanged among the base stations. Only one of two new transmission vectors is exchanged, so this is a cooperative scheme of which exchange degree is not great.

In this cooperative communication scheme, one base station regenerates and transmits a reception signal in Equation 3 using a new transmission vector of another base station included in the same transmission vector set along with interference channel information in phase 2 which the base station already knows.

A process for regenerating and transmitting the reception signal in Equation 3 will be described below.

One of base station #j and a base station #k as base stations included in S(t) regenerates a signal y$_i$(K+t) which is received, in a phase 2, by one of remaining user equipments except for a user equipment #j and a user equipment #k as user equipments to which a corresponding base station provides a service (step 527). Total K−1 pairs are determined by sequentially allowing one duplication two by two for S(1), . . . , S(K) as a transmission vector set including total K transmission vectors. For determined K−1 pairs, base stations included in the same pair transmit a reception signal in a phase 2 which is regenerated at the same time (step 529).

An operation of step 529 will be described below.

Figure 10:
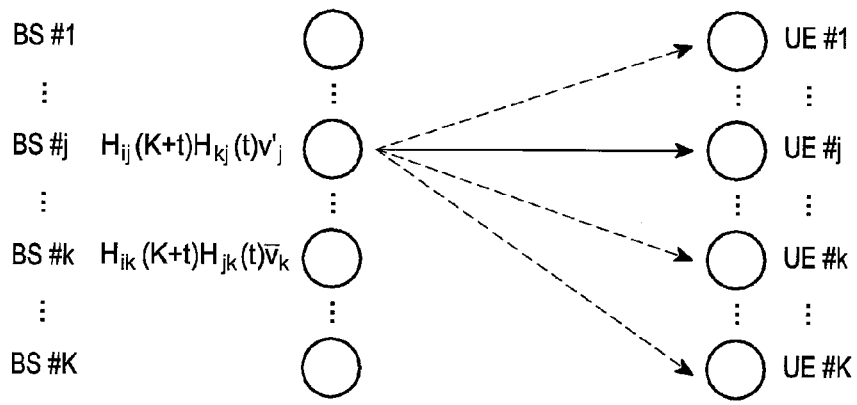
FIG. 10 schematically illustrates a process for generating a transmission symbol vector set in a phase 3 in a base station in a case that a scenario 1 communication environment model is applied to a heterogeneous network-multi cell mobile communication system according to an embodiment of the present disclosure.

As illustrated in FIG. 10, a base station #j as one of the base station #j and a base station #k as base stations included in S(t) regenerates y$_i$(K+t) as a signal which is received, in a phase 2, by a user equipment to which the first base station provides a service among user equipments to which base stations included in S(t+1) (t=1, . . . , K−1) provide a service.

Similarly, the first base station among base stations included in S(K) regenerates a signal which is received, in a phase 2, by a user equipment to which the first base station included in S(1) provides a service. After the regeneration of the signal has been completed, base stations included in S(t) and S(t+1) (t=1, . . . , K−1) transmit a regenerated signal at a time slot #2K+t. This signal transmission is sequentially performed during K−1 time slots, so a phase 3 is performed during total K−1 time slots.

Although not shown in FIG. 5, user equipments store a signal which is received at each time slot in a memory.

After a signal transmitting operation has been completed, user equipments perform a decoding operation on v$_i$ as a symbol vector which the user equipments desire to receive based on received signals, and a process for performing a decoding operation in a user equipment in a heterogeneous network-multi cell mobile communication system according to an embodiment of the present disclosure will be described with reference to FIG. 11.

Figure 11:
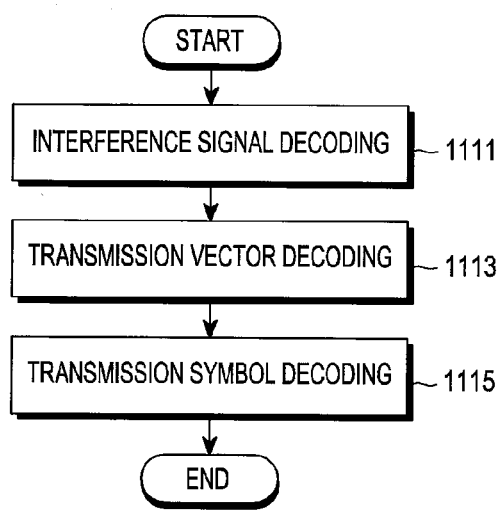
FIG. 11 schematically illustrates a process for performing a decoding operation in a user equipment in a heterogeneous network-multi cell mobile communication system according to an embodiment of the present disclosure.

FIG. 11 schematically illustrates a process for performing a decoding operation in a user equipment in a heterogeneous network-multi cell mobile communication system according to an embodiment of the present disclosure.

Referring to FIG. 11, in a phase 3, each user equipment may identify transmitted signals. For example, this uses a theory that user equipments which know A, B, and C may identify each of A, B, and C using known information upon receiving A+B and B+C. Transmission signals in a phase 3 include a signal which is received, in a phase 2 as a previous phase by user equipments, so each transmission signal may be identified from a form of sequential transmission which allows one duplication, and this will be described below.

Firstly, in a phase 3, a user equipment #j identifies $y_i(K+t)=H_{ij}(K+t)H_{kj}(t)s_1(t)+H_{ik}(K+t)H_{jk}(t)s_2(t)$ as a signal which was received by a user equipment #i which is not included in the same transmission vector set in a phase 2. The user equipment #j detects a value of $H_{kj}(t)s_1(t)$ and a value of $H_{jk}(t)s_2(t)$ by combining $y_i(K+t)=H_{ij}(K+t)H_{kj}(t)s_1(t)+H_{ik}(K+t)H_{jk}(t)s_2(t)$ as a signal which was received in a phase 2 (step 1111).

Next, a user equipment #i uses a reception signal in a phase 1 $y_1(t)=H_{ij}(t)s_1(t)+H_{ik}(t)s_2(t)$. Here, $s_1(t)$ as a new transmission vector is determined using detected $H_{kj}(t)s_1(t)$ and $H_{jk}(t)s_2(t)$, and a reception signal in a phase 1 $y_i(t)=H_{ij}(t)s_1(t)+H_{ik}(t)s_2(t)$ (step 1113). When all user equipments to which a base station provides a service perform a decoding operation as described above, each user equipment has $v_i'$ and $\bar{v}_i$ as new transmission vectors.

Lastly, the user equipments detect $v_i$ as an original transmission symbol vector using the detected two 2N×1 transmission vectors $v_i'$ and $\bar{v}_i$, and Equation 4 (step 1115).

$$v_i = \begin{bmatrix} \Phi_{i,1} \\ \Phi_{i,2} \end{bmatrix}^{-1} \begin{bmatrix} v_i' \\ \bar{v}_i \end{bmatrix} \quad <\text{Equation 4}>$$

As described above, 4N transmission symbols are decoded in a user equipment using total 3K−1 time slots through a phase 1, a phase 2, and a phase 3, so the user equipments may acquire a degree of freedom of 4N/(3K−1).

A case that a base station shares transmission symbol information with other base stations, i.e., a case that the base station performs a cooperative communication with the other base stations has been described above, and a case that a base station does not share transmission symbol information with other base stations, i.e., a case that the base station does not perform a cooperative communication with the other base stations will be described below.

It will be assumed that base stations do not share transmission vector information one another.

Figure 12:
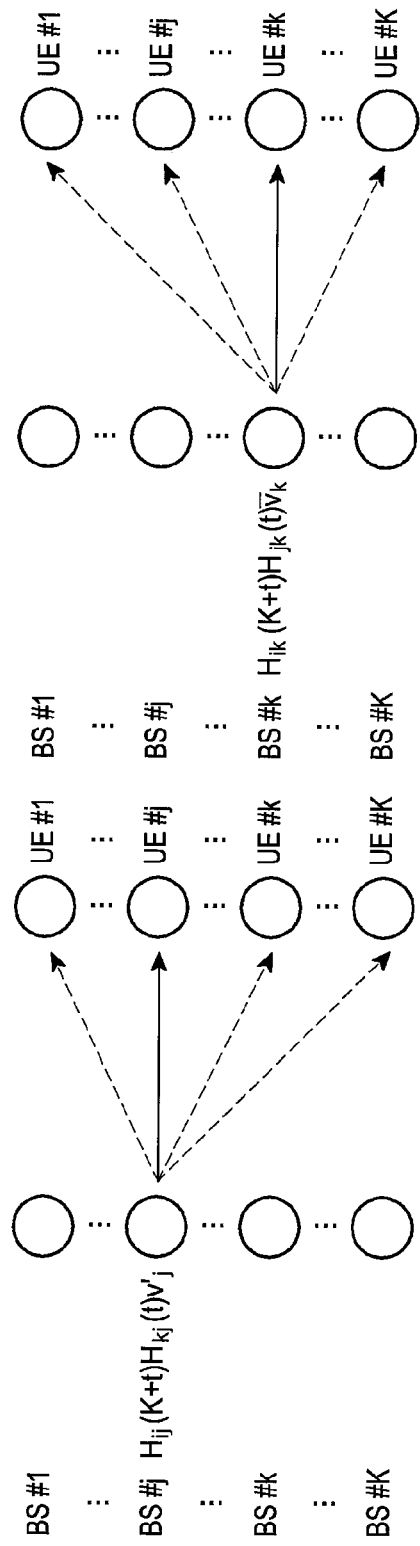
FIG. 12 schematically illustrates a process for regenerating a part of a reception signal in a heterogeneous network-multi cell mobile communication system according to an embodiment of the present disclosure.

If base stations do not perform a cooperative communication, an arbitrary base station regenerates and transmits a part of a reception signal as expressed in Equation 3 based on interference channel information in a phase 2 which the base station already knows. That is, as illustrated in FIG. 12, Txj, i.e., a base station #j regenerates $H_{ij}(K+t)H_{kj}(t)s_1(t)$ and Txk, i.e., a base station #k regenerates $H_{ik}(K+t)H_{jk}(t)s_2(t)$. An operation illustrated in FIG. 12 is an operation which corresponds to step in FIG. 5, and this will be described below.

As described in step 521 in FIG. 5, the base station determines whether to share transmission symbol information, and proceeds to step 523 if the base station does not share the transmission symbol information with other base stations. The base station regenerates a part of a reception signal as expressed in FIG. 3 as illustrated in FIG. 12 in step 523, and proceeds to step 525. The base station transmits the regenerated signal using different time slots at step 525, and proceeds to step 529. Here, step 525 will be described below.

Firstly, total K−1 pairs are determined by sequentially allowing one duplication two by two for S(1), . . . , S(K) as K transmission vector sets. For determined K−1 pairs, base stations included in the same pair transmit a reception signal in a phase 2 which is regenerated. Here, K−1 pairs use difference time slots and perform transmission, and two base stations included in each transmission vector set also use difference time slots, so total 2K−2 time slots are used.

The user equipment #j detects each of $H_{ik}(K+t)H_{jk}(t)s_2(t)$ and $H_{ik}(K+t)H_{jk}(t)s_2(t)$ through an operation in a phase 3. So, Equation 3 may be acquired using a combination of these two values.

In a case that a base station does not share transmission symbol information with other base stations, i.e., in a case that the base station does not perform a cooperative communication with the other base stations, user equipments perform a decoding operation like in a case that a base station shares transmission symbol information with other base stations, i.e., in a case that the base station performs a cooperative communication with the other base stations, this has been described in FIG. 11 and a description thereof will be omitted herein.

Secondly, the scenario 2 communication environment model will be described below.

The scenario 2 communication environment model may solve a lack of the number of transmission antennas through cooperation among base stations when transmission is started if the number of transmission antennas included in a user equipment is less than the number of reception antennas included in the user equipment, unlike the scenario 1 communication environment model.

If the number of reception antennas included in the user equipment is N, the number of transmission antennas included in K−1 base stations is N, and the number of transmission antennas included in one base station is 2N, a base station that the number of antennas is great may be used as macro base station. In this case, base stations other than the base station which is used as the macro base station become femto base stations. The macro base station uses an antenna dimension of the macro base station for a cooperative communication for transmitting a transmission symbol of the femto base stations together.

Like the scenario 1 communication environment model, in FIG. 3, Txi (i=1, . . . , K) indicates a base station #i. $v_i=[v_{i1}, v_{i2}, \ldots, v_{i4N}]^T$ is a symbol vector which the base station #i intends to transmit and includes a 4N×1 vector. Further, Tx1 indicates a macro base station.

In the scenario 2 communication environment model, a transmitting scheme for using channel information which has random time delay for controlling interference includes three phases from a phase 1 to a phase 3 like the scenario 1 communication environment model.

Further, the phase 3 is classified into two operating schemes according to a case of a cooperative communication that a corresponding base station knows symbol information of other base stations after time delay and a case that the corresponding base station does not know the symbol information of the other base stations. A process for processing a transmission signal in a user equipment is identical to a process for processing a transmission signal of a user equipment in a scenario 1 communication environment model, so a detailed description thereof will be omitted herein, and a transmitting process of a femto base station and a macro base station in a heterogeneous network-multi cell mobile communication system according to an embodiment of the present disclosure will be described with reference to FIG. 13.

Figure 13:
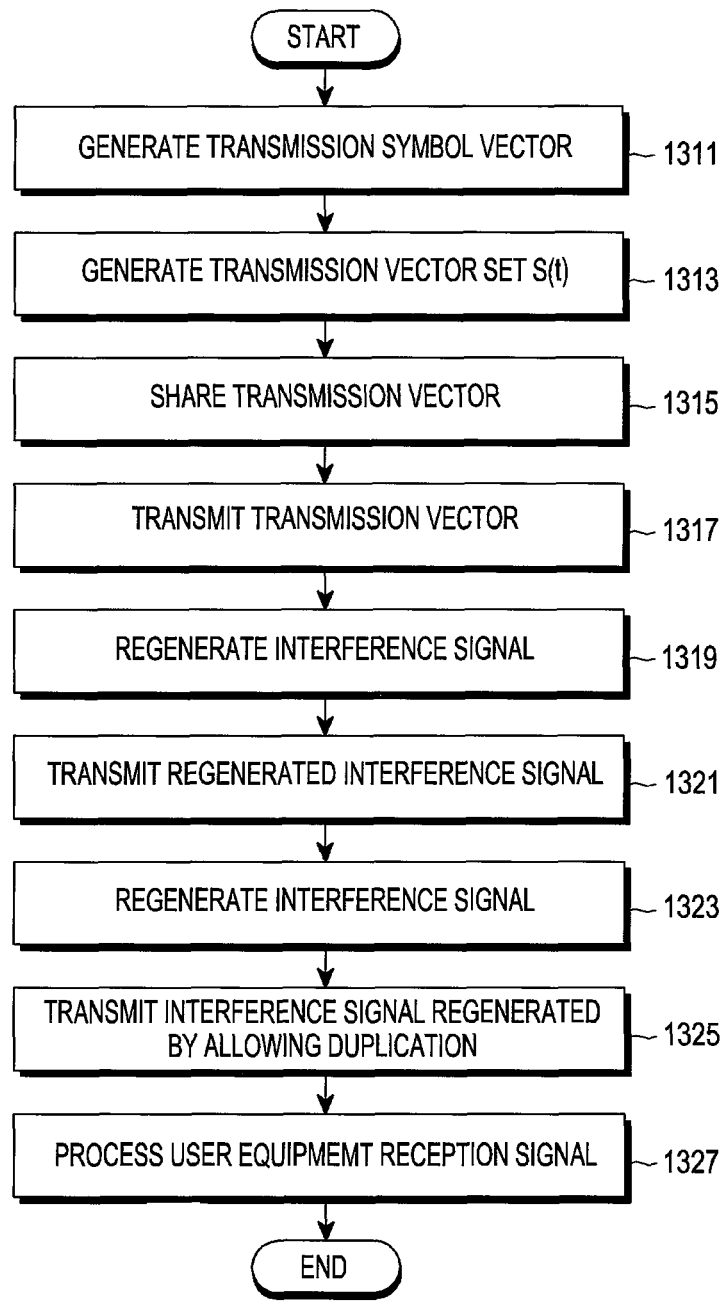
FIG. 13 schematically illustrates a transmitting process of a femto base station and a macro base station in a heterogeneous network-multi cell mobile communication system according to an embodiment of the present disclosure.

FIG. 13 schematically illustrates a transmitting process of a femto base station and a macro base station in a heterogeneous network-multi cell mobile communication system according to an embodiment of the present disclosure.

Prior to a description of FIG. 13, a process from step 1311 to step 1317 corresponds to a phase 1, a process from step 1319 to step 1321 corresponds to a phase 2, and a process from step 1323 to step 1327 corresponds to a phase 3.

Referring to FIG. 13, the base station generates new transmission vectors $v_i'$ and $\bar{v}_i$ like in a phase of a scenario 1 communication environment model at step 1311, and determines time t (t=1, . . . , K) for a transmission vector set. The number of transmission antennas included in a femto base station is N, and N is less than 2N as a size of a new transmission vector. So, the femto base station may not normally transmit the new transmission vector. So, as described in FIG. 9, the femto base station shares the new transmission vectors $v_i'$ and $\bar{v}_i$ with a macro-cell (step 1315).

Figure 14:
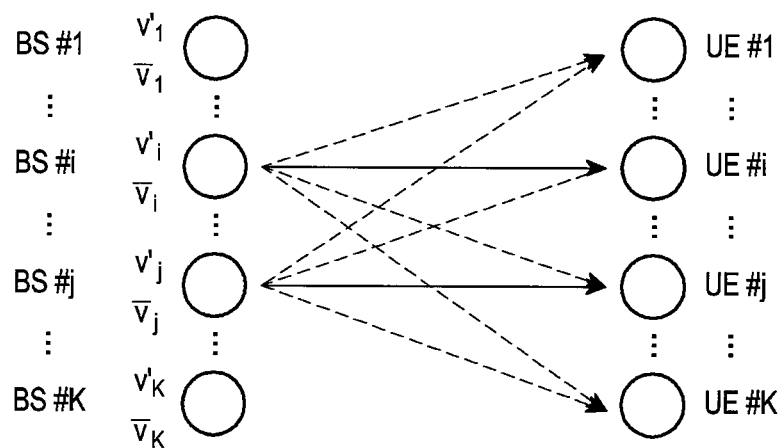
FIG. 14 schematically illustrates a process for transmitting a transmitting a transmission vector in a macro base station in a heterogeneous network-multi cell mobile communication system according to an embodiment of the present disclosure.

Here, in a phase 1 as illustrated in FIG. 13, a macro base station transmits ½ elements for a transmission vector $s_1(t)$, $s_2(t)$ of femto base stations included in a transmission vector set S(t), i.e., a femto base station #j and a femto base station #k during K time slots as illustrated in FIG. 14. At the same time, the femto base station #j and a femto base station #k transmit remaining ½ elements for a transmission vector $s_1(t)$, $s_2(t)$ (step 1317). For example, in an embodiment of the present disclosure, it will be assumed that first N elements are transmitted to a base station #1 as a macro base station.

If the macro base station is included in a transmission vector set S(n) at time n (n=1, . . . , K), the macro base station transmits a transmission vector of the macro base station while a femto base station transmits N transmission vector elements.

Further, $G_{ij}(t)=[\tilde{H}_{j1}(t),\tilde{H}_{ij}(t)]$ denotes an N×2N matrix that a channel from the macro base station to a user equipment #1 and a channel from a femto base station #j to the user equipment #1 are combined if the macro base station transmits transmission vector elements of the femto base station #j.

Further, $\tilde{H}_{j1}(t),\tilde{H}_{ij}(t)$ denotes an N×N channel that the transmission vector elements of the femto base station #j experiences when the transmission vector elements of the femto base station #j transmitted from the macro base station is received in the user equipment #1. If a transmission vector for the macro base station is transmitted, $G_{ij}(t)=H_{j1}(t)$ is given using $H_{j1}(t)$ as a channel matrix from a macro-cell to the user equipment #1.

Using this, a reception signal in the user equipment #1 may be expressed as Equation 5.

$$y_1(t)=G_{ij}(t)s_1(t)+G_{ik}(t)s_2(t) \qquad \text{<Equation 5>}$$

The number of reception antennas included in a user equipment is N, so $y_1(t)$ in Equation 5 is composed of an N×1 vector.

A phase 2 generates a transmission signal using interference channel information in a phase 1 which is given after time delay. Like in the scenario 1 communication environment model, the phase 2 is performed during K time slots corresponding to K time slots in a phase 1. Base stations use a time slot corresponding to each transmission vector set order according to set relation of transmission vectors classified in a phase 1.

Figure 15:
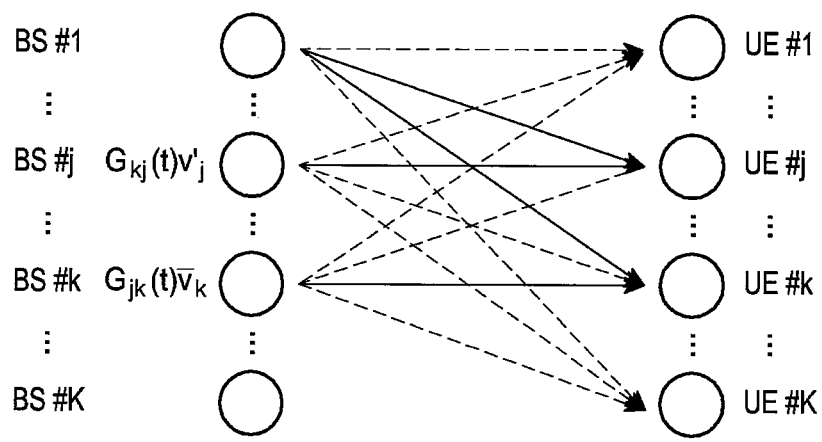
FIG. 15 schematically illustrates a process for regenerating and transmitting interference in a macro base station in a heterogeneous network-multi cell mobile communication system according to an embodiment of the present disclosure.

The phase 2 regenerates an interference which is received from a signal of other base station included in the same symbol set (step 1319) and transmits the interference. For example, if a new transmission vector $v_i',\bar{v}_j$ of a base station #i and a base station #j included in the same set is transmitted at time t, the base station #i and the base station #j regenerate and transmit $G_{ji}(t)v_i'$ and $G_{ij}(t)\bar{v}_j$ at time K+t in a phase 2 as illustrated in FIG. 15. Like in the phase 1, the macro base station and a femto base station regenerate a reception signal as expressed in Equation 5 as a reception signal in the phase 1 corresponding to transmission time order according to a transmission vector set S(t). If the reception signal as expressed in Equation 5 is expressed using a reception signal of a user equipment #i at time K+t, the Equation 5 may be expressed as Equation 6.

$$y_i(K+t)=G_{ij}(K+t)G_{kj}(t)s_1(t)+G_{ik}(K+t)G_{jk}(t)s_2(t) \qquad \text{<Equation 6>}$$

Like the reception signal in the phase 1, i.e., the reception signal expressed as Equation 2, the reception signal in the phase 2, i.e., the reception signal expressed as Equation 6 is generated as an N×1 vector.

Although not shown in FIG. 13, each of user equipments stores a signal which is received in a time slot in a memory.

A phase 3 will be described below.

In the phase 3, a transmission signal is generated using channel information in the phase 2 which is given after time delay. A macro base station knows transmission vector information already, a case that base stations perform a cooperative communication among cases in a phase 3 as described in the scenario 1 communication environment model may be equally applied in the scenario 2 communication environment model.

Firstly, transmission in the phase 3 is performed as following.

A macro base station regenerates a signal, i.e., the signal expressed in Equation 6, which is received, in the phase 2, by one of user equipments except for a user equipment #j and a user equipment #k as user equipments which receive a service from base stations included in S(t), i.e., a base station #j and a base station #k (step 1323). Total K−1 pairs are determined by sequentially allowing one duplication two by two for S(1), . . . , S(K) as K transmission vector sets. For determined K−1 pairs, regenerated reception signals of a phase 2 of base stations included in the same pair are transmitted at the same time (step 1325).

The operating process at step 1325 will be described with reference to FIG. 16.

Figure 16:
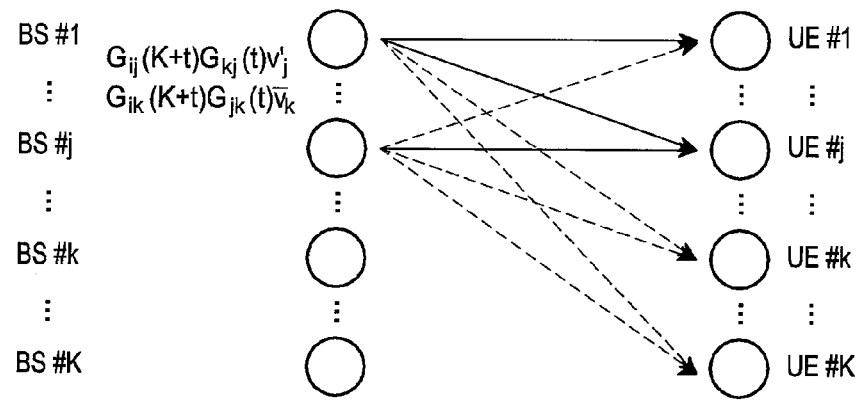
FIG. 16 schematically illustrates an operating process at step 1325 in FIG. 13.

FIG. 16 schematically illustrates an operating process at step 1325 in FIG. 13.

Referring to FIG. 16, a macro base station regenerates a signal received, in a phase 2, by a user equipment which receives a service from the first base station among user equipments to which base stations included in a transmission vector set S(t), i.e., a base station #j and a base station #k provide a service. Here, the received signal is a signal expressed as Equation 6.

If the regeneration of the signal is terminated, the macro base station transmits a signal which is regenerated by base stations included in S(t) and S(t+1) (t=1, . . . , K−1) at a time slot 2K+t. This transmission is sequentially during K−1 slots, so a phase 3 is performed during K−1 time slots.

Although not shown in FIG. 13, each user equipments stores a signal which is received in a time slot in a memory.

When a transmitting operation up to a phase 3 has been completed, user equipments decode $v_i$ as a desired symbol vector $v_i$ based on received signals, and a decoding process will be described below.

In a phase 3, each user equipment may identify transmitted signals. For example, this uses a theory that user equipments which know A, B, and C may identify each of A, B, and C using known information upon receiving A+B and B+C. Transmission signals in a phase 3 include a signal which is received, in a phase 2 as a previous phase by user equipments, so each transmission signal may be identified from a form of sequential transmission which allows one duplication, and this will be described below.

Firstly, in a phase 3, a user equipment #j identifies $y_i(K+t)=G_{ij}(K+t)G_{kj}(t)s_1(t)+G_{ik}(K+t)G_{jk}(t)s_2(t)$ as a signal which was received by a user equipment #i which is not included in the same transmission vector set in a phase 2. The user equipment #j detects a value of $G_{kj}(t)s_1(t)$ and a value of $G_{jk}(t)s_2(t)$ by combining $y_i(K+t)=G_{ij}(K+t)G_{kj}(t)s_1(t)+G_{jk}(K+t)G_{jk}(t)s_2(t)$ as a signal which was received in a phase 2.

A user equipment #i uses a reception signal in a phase 1 $y_i(t)=G_{ij}(t)s_1(t)+G_{ik}(t)s_2(t)$. Here, a value of s1(t) as a new transmission vector is detected using the detected $G_{kj}(t)s_1(t)$ and $G_{ji}(t)v_i'$, and the reception signal in the phase 1 $y_i(t)=G_{ij}(t)s_1(t)+G_{ik}(t)s_2(t)$. When all user equipments to which a base station provides a service perform a decoding operation as described above, each user equipment has $v_i'$ and $\bar{v}_i$ as new transmission vectors.

Lastly, the user equipments detect $v_i$ as an original transmission symbol vector using the detected two 2N×1 transmission vectors $v_i'$ and $\bar{v}_i$, and Equation 4.

As described above, 4N transmission symbols are decoded in a user equipment using total 3K−1 time slots through a phase 1, a phase 2, and a phase 3, so the user equipments may acquire a degree of freedom of 4N/(3K−1).

Although FIG. 5 illustrates a process for controlling interference in a base station in a case that a scenario 1 communication environment model is applied to a heterogeneous network-multi cell mobile communication system according to an embodiment of the present disclosure, various changes could be made to FIG. 5. For example, although shown as a series of operations, various operations in FIG. 5 could overlap, occur in parallel, occur in a different order, or occur multiple times.

Although FIG. 11 illustrates a process for performing a decoding operation in a user equipment in a heterogeneous network-multi cell mobile communication system according to an embodiment of the present disclosure, various changes could be made to FIG. 11. For example, although shown as a series of operations, various operations in FIG. 11 could overlap, occur in parallel, occur in a different order, or occur multiple times.

Although FIG. 13 illustrates a transmitting process of a femto base station and a macro base station in a heterogeneous network-multi cell mobile communication system according to an embodiment of the present disclosure, various changes could be made to FIG. 13. For example, although shown as a series of operations, various operations in FIG. 13 could overlap, occur in parallel, occur in a different order, or occur multiple times.

An inner structure of a base station in a heterogeneous network-multi cell mobile communication system according to an embodiment of the present disclosure will be described with reference to FIG. 17.

Figure 17:
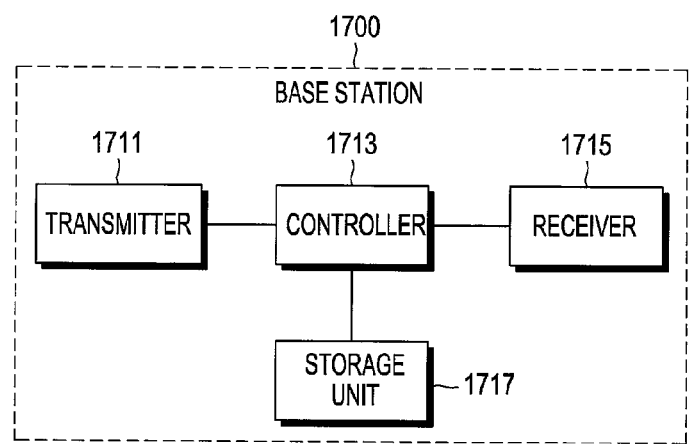
FIG. 17 schematically illustrates an inner structure of a base station in a heterogeneous network-multi cell mobile communication system according to an embodiment of the present disclosure.

FIG. 17 schematically illustrates an inner structure of a base station in a heterogeneous network-multi cell mobile communication system according to an embodiment of the present disclosure.

Referring to FIG. 17, a base station 1700 includes a transmitter 1711, a controller 1713, a receiver 1715, and a storage unit 1717.

The controller 1713 controls the overall operation of the base station 1700. More particularly, the controller 1713 controls an operation related to an interference control operation in a heterogeneous network-multi cell mobile communication system as described with reference to FIGS. 3 to 16. The operation related to the interference control operation in the heterogeneous network-multi cell mobile communication system has been described with reference to FIGS. 3 to 16 and a detailed description thereof will be omitted herein.

The transmitter 1711 transmits, to other base stations or user equipments, various signals and various messages related to the interference control operation in the heterogeneous network-multi cell mobile communication system as described with reference to FIGS. 3 to 16 under a control of the controller 1713.

The receiver 1715 receives, from other base stations or user equipments, various signals and various messages related to the interference control operation in the heterogeneous network-multi cell mobile communication system as described with reference to FIGS. 3 to 16 under a control of the controller 1713.

The storage unit 1717 stores various programs, various data, and the like related to the interference control operation in the heterogeneous network-multi cell mobile communication system as described with reference to FIGS. 3 to 16. The storage unit 1717 stores various signals and various messages which are received by the receiver 1715.

While the transmitter 1711, the controller 1713, the receiver 1715, and the storage unit 1717 are described in the base station 1700 as separate processing units, the base station 1700 may be implemented with one processor in which the transmitter 1711, the controller 1713, the receiver 1715, and the storage unit 1717 are incorporated.

An inner structure of a base station in a heterogeneous network-multi cell mobile communication system according to an embodiment of the present disclosure has been described with reference to FIG. 17, and an inner structure of a user equipment in a heterogeneous network-multi cell mobile communication system according to an embodiment of the present disclosure will be described with reference to FIG. 18.

Figure 18:
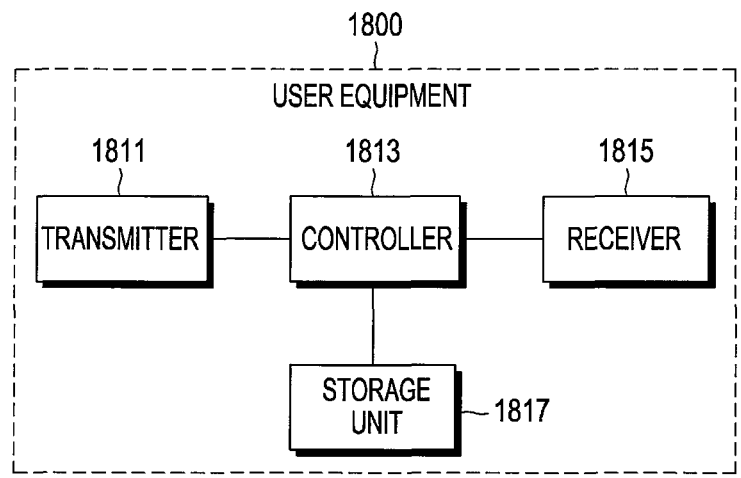
FIG. 18 schematically illustrates an inner structure of a user equipment in a heterogeneous network-multi cell mobile communication system according to an embodiment of the present disclosure.

FIG. 18 schematically illustrates an inner structure of a user equipment in a heterogeneous network-multi cell mobile communication system according to an embodiment of the present disclosure.

Referring to FIG. 18, a user equipment 1800 includes a transmitter 1811, a controller 1813, a receiver 1815, and a storage unit 1817.

The controller 1813 controls the overall operation of the user equipment 1800. More particularly, the controller 1813 controls an operation related to interference control operation in a heterogeneous network-multi cell mobile communication system as described with reference to FIGS. 3 to 16. The operation related to the interference control operation in the heterogeneous network-multi cell mobile communication system has been described with reference to FIGS. 3 to 16 and a detailed description thereof will be omitted herein.

The transmitter 1811 transmits, to base stations, various signals and various messages related to the interference control operation in the heterogeneous network-multi cell mobile communication system as described with reference to FIGS. 3 to 16 under a control of the controller 1813.

The receiver 1815 receives, from base stations, various signals and various messages related to the interference control operation in the heterogeneous network-multi cell mobile communication system as described with reference to FIGS. 3 to 16 under a control of the controller 1813.

The storage unit 1817 stores various programs, various data, and the like related to the interference control operation in the heterogeneous network-multi cell mobile communication system as described with reference to FIGS. 3 to 16. The storage unit 1817 stores various signals and various messages which are received by the receiver 1815.

While the transmitter 1811, the controller 1813, the receiver 1815, and the storage unit 1817 are described in the user equipment 1800 as separate processing units, the user equipment 1800 may be implemented with one processor in which the transmitter 1811, the controller 1813, the receiver 1815, and the storage unit 1817 are incorporated.

An inner structure of a user equipment in a heterogeneous network-multi cell mobile communication system according to an embodiment of the present disclosure has been described with reference to FIG. 18, and an inner structure of a control apparatus in a heterogeneous network-multi cell mobile communication system according to an embodiment of the present disclosure will be described with reference to FIG. 19.

Figure 19:
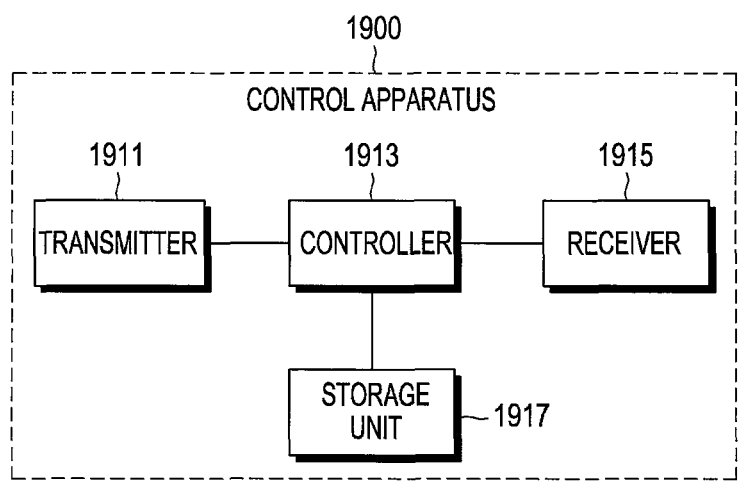
FIG. 19 schematically illustrates an inner structure of a control apparatus in a heterogeneous network-multi cell mobile communication system according to an embodiment of the present disclosure.

FIG. 19 schematically illustrates an inner structure of a control apparatus in a heterogeneous network-multi cell mobile communication system according to an embodiment of the present disclosure.

Referring to FIG. 19, a control apparatus 1900 includes a transmitter 1911, a controller 1913, a receiver 1915, and a storage unit 1917.

The controller 1913 controls the overall operation of the control apparatus 1900. More particularly, the controller 1913 controls an operation related to an interference control operation in a heterogeneous network-multi cell mobile communication system as described with reference to FIGS. 3 to 16. The operation related to the interference control operation in the heterogeneous network-multi cell mobile communication system has been described with reference to FIGS. 3 to 16 and a detailed description thereof will be omitted herein.

The transmitter 1911 transmits, to base stations, various signals and various messages related to the interference control operation in the heterogeneous network-multi cell mobile communication system as described with reference to FIGS. 3 to 16 under a control of the controller 1913.

The receiver 1915 receives, from base stations, various signals and various messages related to the interference control operation in the heterogeneous network-multi cell mobile communication system as described with reference to FIGS. 3 to 16 under a control of the controller 1913.

The storage unit 1917 stores various programs, various data, and the like related to the interference control operation in the heterogeneous network-multi cell mobile communication system as described with reference to FIGS. 3 to 16. The storage unit 1917 stores various signals and various messages which are received by the receiver 1915.

While the transmitter 1911, the controller 1913, the receiver 1915, and the storage unit 1917 are described in the control apparatus 1900 as separate processing units, the control apparatus 1900 may be implemented with one processor in which the transmitter 1911, the controller 1913, the receiver 1915, and the storage unit 1917 are incorporated.

An inner structure of a control apparatus in a heterogeneous network-multi cell mobile communication system according to an embodiment of the present disclosure has been described with reference to FIG. 19, and performance of an interference control scheme in a heterogeneous network-multi cell mobile communication system according to an embodiment of the present disclosure will be described with reference to FIG. 20.

Figure 20:
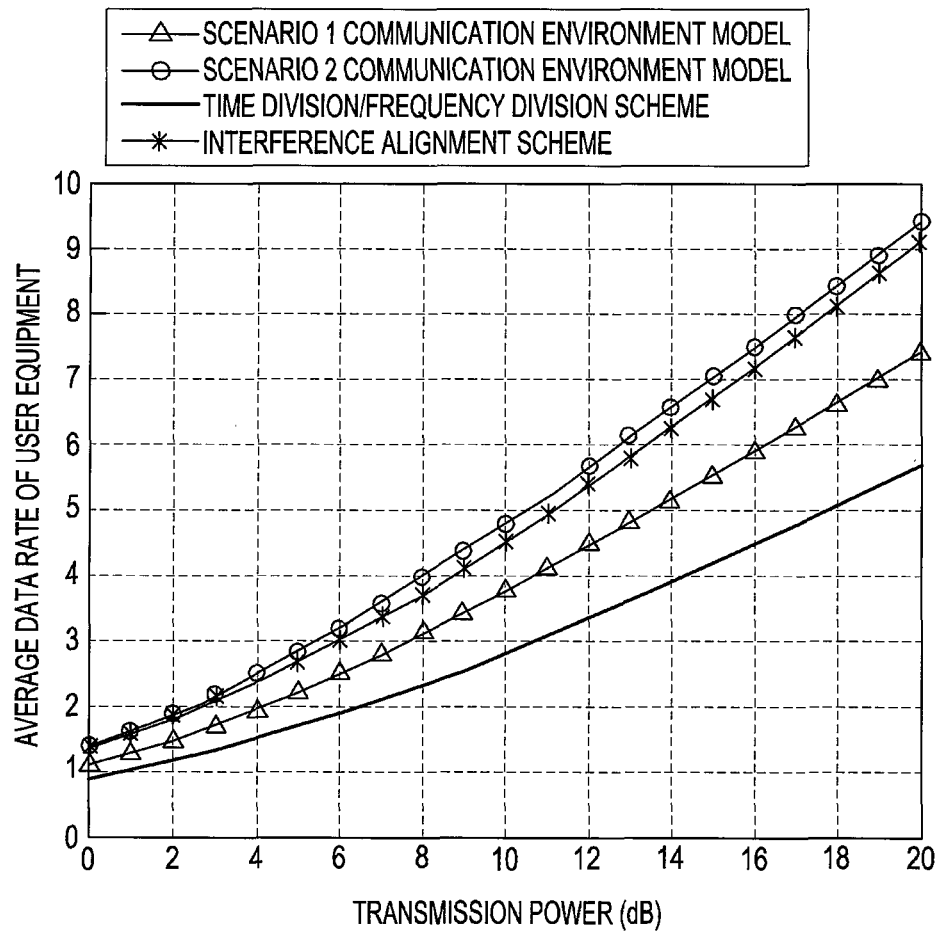
FIG. 20 schematically illustrates performance of an interference control scheme in a heterogeneous network-multi cell mobile communication system according to an embodiment of the present disclosure.

FIG. 20 schematically illustrates performance of an interference control scheme in a heterogeneous network-multi cell mobile communication system according to an embodiment of the present disclosure.

Prior to a description of FIG. 20, it will be noted that a performance graph illustrated in FIG. 20 is made by considering relation between a data rate ration which may be averagely achieved by one user equipment for an environment that there are four base stations and the number of antennas used in a user equipment is two, and transmission power.

Firstly, a performance graph illustrated as "scenario 1 communication environment model" indicates a performance graph in a case that a scenario 1 communication environment model according to an embodiment of the present disclosure is applied. That is, the performance graph in the case that the scenario 1 communication environment model is applied indicates performance of a user equipment that performs steps 523 and 525 since base stations do not exchange transmission symbol information according to determination at step 521 as described in FIG. 5 in the scenario 1 communication environment model.

Further, a performance graph illustrated as "scenario 2 communication environment model" indicates a performance of a user equipment in a case that a scenario 2 communication environment model according to an embodiment of the present disclosure is applied.

Meanwhile, it will be noted that a performance of a user equipment in a case that base stations exchange transmission symbol information according to determination at step 521 in FIG. 5 if the scenario 1 communication environment model is applied may be detected using the performance of the user equipment in the case that the scenario 2 communication environment model is applied, so a performance graph for this is not illustrated in FIG. 20.

Further, a performance graph illustrated as "time division/frequency division scheme" indicates a performance graph in a case that a time division/frequency division scheme used in a general multi cell mobile communication system is applied, and a performance graph illustrated as "interference alignment scheme" indicates a performance graph in a case that an interference alignment scheme used in a general multi cell mobile communication system is applied.

Comparing to the cases that the interference alignment scheme and the time division/frequency division scheme are applied, a user equipment may acquire a maximum data rate up to transmission power 20 dB in a case that the scenario 2 communication environment model is applied, and may acquire a data rate which is always higher than a data rate for the case that the time division/frequency division scheme is applied in a case that that the scenario 1 communication environment model is applied. This means that a degree of freedom of $4N/(3K-1)$ is achieved in a case that base stations cooperates such as a case that the scenario 1 communication environment model is applied, i.e., a case that base stations exchange transmission symbol information at step 521, or a case that the scenario 2 communication environment model is applied when channel information is given to a base station after time delay, and a data rate similar to a data rate for a case that the interference alignment scheme which requires channel information related to all signal transmitting/receiving apparatuses is applied may be acquired when relatively low transmission power is used.

Further, this means that a degree of freedom of $4N/(4K-2)$ is achieved although base stations do not exchange transmission symbol information according to determination at step 521, and the higher data rate may be acquired if magnitude of transmission power becomes greater comparing to a case that the time division/frequency division scheme which does not use channel information is applied, when the scenario 1 communication environment model is applied.

An embodiment of the present disclosure enables to effectively control interference in a heterogeneous network-multi cell mobile communication system.

An embodiment of the present disclosure enables to effectively control interference by considering time delay for interference channel feedback in a heterogeneous network-multi cell mobile communication system.

An embodiment of the present disclosure enables to effectively control interference by considering time delay for interference channel feedback while assuming that all of signal transmitting apparatuses know channel information among all of the signal transmitting apparatuses and all of signal receiving apparatuses one another in a heterogeneous network-multi cell mobile communication system.

Further, an embodiment of the present disclosure enables to use channel information with random time delay for a complex communication environment that there are a plurality of macro cells and a plurality of femto-cells thereby effectively digressing from impact of interference regardless of a utilization probability for real-time channel information and acquiring total antenna dimensions.

Further, a degree of freedom of an antenna dimension which may be acquired according to an embodiment of the present disclosure is $4N/(3K-1)$ and $4N/(4K-2)$ in a scenario 1 communication environment model, and is $4N/(3K-1)$ in a scenario 2 communication environment model. So, comparing to a degree of freedom N/K which may be acquired in a case that an existing a time division/frequency division scheme which does not use delayed channel information is used, in a degree of freedom $4N/(3K-1)$, it will be understood that difference of degrees of freedom becomes larger if the number of base stations which compose an interference environment is relatively large. In a case of a degree of freedom $4N/(4K-2)$, it will be understood that difference of degrees of freedom becomes larger if the number of base stations which compose an interference environment is relatively small.

So, an embodiment of the present disclosure enables to effectively improve a problem of an existing interference control technique which has been affected by interference due to technical limitations that all of feedback amount according to the number of cells and channel change which changes in real time may be not considered, or which endures ineffective waste of a time and frequency resource for controlling interference. Further, an embodiment of the present disclosure enables to occupy a role of pioneer and a related technology in advance for how interference control according to use of non real-time channel information for a future communication environment that a plurality of base stations exist together and communicate is advantageous for improving performance.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital versatile disk (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of operating a base station (BS) in a mobile communication system, the method comprising:
    generating and transmitting, to a first terminal, a first signal, which is generated based on a symbol and a first channel matrix between a first neighbor BS of the BS and the first terminal, served by the BS, wherein the symbol is transmitted from the BS to the first terminal; and
    generating and transmitting, to the first terminal, a second signal, which is obtained based on a second channel matrix between the BS and a second terminal, and a third channel matrix between the first neighbor BS and the second terminal, wherein the second terminal is served by a second neighbor BS, and wherein the second channel matrix and the third channel matrix are obtained at transmission time of the first signal.

2. The method of claim 1, further comprising:
   determining whether the BS shares transmission signal information with the first neighbor BS.

3. The method of claim 2, comprising:
   generating the second signal, if the BS does not share the transmission signal information with the first neighbor BS; and
   transmitting the generated second signal.

4. The method of claim 2, comprising:
   generating the second signal by allowing a preset count of duplication if the BS shares the transmission signal information with the first neighbor BS; and
   transmitting the generated second signal.

5. The method of claim 1, further comprising:
   sharing transmission signal information with the first neighbor BS.

6. The method of claim 5, wherein the first signal is allowed by a preset count of duplication.

7. A method of operating a first terminal in a mobile communication system, the method comprising:
   receiving, from a base station (BS), a first signal, which is generated by the BS based on a symbol and a first channel matrix between a first neighbor BS of the BS and the first terminal, served by the BS, wherein the symbol is transmitted from the BS to the first terminal; and
   receiving, from the BS, a second signal, which is obtained based on a second channel matrix between the BS and a second terminal and a third channel matrix between the first neighbor BS and the second terminal, wherein the second terminal is served by a second neighbor BS, and wherein the second channel matrix and the third channel matrix are obtained at transmission time of the first signal.

8. The method of claim 7, wherein the BS shares transmission signal information with the first neighbor BS.

9. The method of claim 8, further comprising:
   detecting a transmission symbol by decoding the first signal.

10. The method of claim 7, wherein the second signal is generated, if the BS does not share the transmission signal information with the first neighbor BS.

11. The method of claim 10, further comprising:
   detecting a transmission symbol by decoding the first signal.

12. The receiving apparatus of claim 10, wherein the processor is configured to control the transceiver to detect a transmission symbol by decoding the first signal.

13. The method of claim 7, wherein the first signal is allowed by a preset count of duplication.

14. The method of claim 7, further comprising:
   detecting a transmission symbol by decoding the first signal.

15. A first terminal in a mobile communication system, the first terminal comprising:
   a transceiver; and
   a processor configured to control the transceiver to:
      receive, from a base station (BS), a first signal, which is generated by the BS based on a symbol and a first channel matrix between a first neighbor BS of the BS and the first terminal served by the BS, wherein the symbol is transmitted from the BS to the first terminal, and
      receive, from the BS, a second signal, which is obtained based on a second channel matrix between the BS and a second terminal and a third channel matrix between the first neighbor BS and the second terminal, wherein the second terminal is served by a second neighbor BS, and wherein the second channel matrix and the third channel matrix are obtained at transmission time of the first signal.

16. The first terminal of claim 15, wherein the BS shares transmission signal information with the first neighbor BS.

17. The receiving apparatus of claim 16, wherein the processor is configured to control the transceiver to detect a transmission symbol by decoding the first signal.

18. The first terminal of claim 15, wherein the second signal is generated, if the BS does not share the transmission signal information with the first neighbor BS.

19. The first terminal of claim 15, wherein the first signal is allowed by a preset count of duplication.

20. The first terminal of claim 15, wherein the processor is configured to control the transceiver to detect a transmission symbol by decoding the first signal.

* * * * *